United States Patent
Hoshi et al.

(10) Patent No.: US 12,555,194 B2
(45) Date of Patent: Feb. 17, 2026

(54) GATING CAMERA, SENSING SYSTEM FOR VEHICLE, VEHICLE LAMP

(71) Applicant: KOITO MANUFACTURING CO., LTD., Tokyo (JP)

(72) Inventors: Kenichi Hoshi, Shizuoka (JP); Ryo Ota, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 73 days.

(21) Appl. No.: 18/294,482

(22) PCT Filed: Aug. 5, 2022

(86) PCT No.: PCT/JP2022/030165
§ 371 (c)(1),
(2) Date: Feb. 1, 2024

(87) PCT Pub. No.: WO2023/013776
PCT Pub. Date: Feb. 9, 2023

(65) Prior Publication Data
US 2025/0095106 A1    Mar. 20, 2025

(30) Foreign Application Priority Data
Aug. 5, 2021    (JP) .................................. 2021-129013

(51) Int. Cl.
*G06T 5/50*        (2006.01)
*G06T 7/521*       (2017.01)
(Continued)

(52) U.S. Cl.
CPC ................ *G06T 5/50* (2013.01); *G06T 7/521* (2017.01); *G06T 7/55* (2017.01);
(Continued)

(58) Field of Classification Search
None
See application file for complete search history.

(56) References Cited

U.S. PATENT DOCUMENTS

| 9,712,754 B2 | 7/2017 | Grauer et al. |
| 2002/0049530 A1* | 4/2002 | Poropat .................... G01S 5/16 701/23 |

(Continued)

FOREIGN PATENT DOCUMENTS

| JP | 2009-257981 A | 11/2009 |
| JP | 2010-121995 A | 6/2010 |

(Continued)

OTHER PUBLICATIONS

Li et al. "Experimental Research on 3D Reconstruction through Range Gated Laser Imaging", 7th International Symposium on Advanced Optical Manufacturing and Testing Technologies: Large Mirrors and Telescopes, edited by Wenhan Jiang, Myung K. Cho, Fan Wu, Proc. of SPIE vol. 9280, 92800B © 2014 SPIE (Year: 2014).*

(Continued)

*Primary Examiner* — Xiaolan Xu
(74) *Attorney, Agent, or Firm* — Sughrue Mion, PLLC (57) ABSTRACT

An illumination device irradiates a field of view with pulsed illumination light. A camera controller controls a light emission timing of the illumination device and an exposure timing of an image sensor. An image processing device generates a composite image by synthesizing a plurality of slice images output from the image sensor. The image processing device sets, as a valid image, a range that takes a local maximum value when pixels at the same position in each of the plurality of slice images are arranged in range order. The image processing device generates a pixel value at the same position in the composite image, based on a pixel (Continued)

value at the same position in the slice image corresponding to the valid range.

8 Claims, 12 Drawing Sheets

(51) Int. Cl.
*G06T 7/55* (2017.01)
*H04N 23/74* (2023.01)

(52) U.S. Cl.
CPC ............... *G06T 2207/20021* (2013.01); *G06T 2207/20212* (2013.01); *G06T 2207/30252* (2013.01); *H04N 23/74* (2023.01)

(56) References Cited

U.S. PATENT DOCUMENTS

| | | | |
|---|---|---|---|
| 2012/0134536 | A1 | 5/2012 | Myokan |
| 2017/0200044 | A1 | 7/2017 | Lee et al. |
| 2017/0200283 | A1 | 7/2017 | Yamaguchi |
| 2019/0004150 | A1 | 1/2019 | Mano et al. |
| 2021/0165204 | A1 | 6/2021 | Pande et al. |
| 2021/0295065 | A1* | 9/2021 | Arai ..................... G06V 20/58 |
| 2022/0214434 | A1 | 7/2022 | Kato et al. |
| 2023/0179841 | A1 | 6/2023 | Itaba et al. |

FOREIGN PATENT DOCUMENTS

| | | | |
|---|---|---|---|
| JP | 2010-145255 A | 7/2010 | |
| JP | 2012-113622 A | 6/2012 | |
| JP | 2017-126979 A | 7/2017 | |
| JP | 2018-124890 A | 8/2018 | |
| JP | 2019-159503 A | 9/2019 | |
| JP | 2020-174154 A | 10/2020 | |
| WO | 2017/110417 A1 | 6/2017 | |
| WO | WO-2020121973 A1 * | 6/2020 | ............ G01S 17/18 |
| WO | 2020/184447 A1 | 9/2020 | |
| WO | 2021/060397 A1 | 4/2021 | |

OTHER PUBLICATIONS

Communication dated Nov. 4, 2024, issued by European Patent Office in European Patent Application No. 22853194.3.
International Search Report (PCT/ISA/210) issued by the International Searching Authority on Sep. 13, 2022 in corresponding International Application No. PCT/JP2022/030165.
Written Opinion (PCT/ISA/237) issued by the International Searching Authority on Sep. 13, 2022 in corresponding International Application No. PCT/JP2022/030165.

* cited by examiner

GATING CAMERA, SENSING SYSTEM FOR VEHICLE, VEHICLE LAMP

CROSS REFERENCE TO RELATED APPLICATIONS

This application is a National Stage of International Application No. PCT/JP2022/030165 filed on Aug. 5, 2022 claiming priority from Japanese Patent Application No. 2021-129013 filed on Aug. 5, 2021.

TECHNICAL FIELD

The present disclosure relates to a gating camera.

BACKGROUND ART

An object identification system that senses a location and a type of an object around a vehicle is used for automatic driving or automatic control of a light distribution of a headlamp. The object identification system includes a sensor and an arithmetic processing device that analyzes an output of the sensor. The sensor is selected from a camera, a light detection and ranging or laser imaging detection and ranging (LiDAR), a millimeter-wave radar, an ultrasonic sonar, and the like, considering use, required precision, and cost.

Depth information cannot be obtained from a general monocular camera. Therefore, when a plurality of objects located at different distances overlap, it is difficult to separate the objects.

As a camera from which depth information is obtained, a TOF camera is known. A time of flight (TOF) camera projects infrared light by a light-emitting device, measures a time of flight until reflected light returns to an image sensor, and obtains a TOF image by converting the time of flight into distance information.

A gating camera or gated camera has been suggested as an active sensor replacing the TOF camera (Patent Literatures 1 and 2). The gating camera divides a shooting range into a plurality of ranges and captures images while changing an exposure timing and an exposure time for each range. Thereby, a slice image is obtained for each target range, and each slice image includes only an object included in the corresponding range.

CITATION LIST

Patent Literature

Patent Literature 1: JP2009-257981A
Patent Literature 2: WO2017/110417A1
Patent Literature 3: JP2019-159503A
Patent Literature 4: JP2017-126979A
Patent Literature 5: JP2012-113622A

SUMMARY OF INVENTION

Technical Problem

By synthesizing a plurality of slice images, it is possible to generate a composite image containing objects in a full depth of a field of view. When pixels at the same position in each of the slice images are added, an image quality of the composite image deteriorates because noise is included.

One aspect of the present disclosure has been made in view of the above situation, and one of exemplary objects thereof is to improve an image quality of a composite image.

One of exemplary purposes of another aspect is to improve the efficiency of image processing.

Solution to Problem

A gating camera of one aspect of the present disclosure is configured to divide a field of view in a depth direction into a plurality of ranges and to generate a plurality of slice images corresponding to the plurality of ranges. The gating camera includes an illumination device configured to irradiate a field of view with pulsed illumination light, an image sensor, a camera controller configured to control a light emission timing of the illumination device and an exposure timing of the image sensor and to cause the image sensor to generate a plurality of slice images corresponding to a plurality of ranges, and an image processing device configured to generate a composite image by synthesizing the plurality of slice images output from the image sensor. The image processing device is configured to set, as a valid range, a range that takes a local maximum value when pixels at the same position in each of the plurality of slice images are arranged in range order, and to generate a pixel value at the same position in the composite image on the basis of a pixel value at the same position in the slice image corresponding to the valid range.

Another aspect of the present disclosure is also a gating camera. The gating camera includes an illumination device configured to irradiate a field of view with pulsed illumination light, an image sensor, a camera controller configured to control a light emission timing of the illumination device and an exposure timing of the image sensor, and an image processing device configured to receive a plurality of slice images from the image sensor and to generate a distance map image, wherein a pixel in the distance map image indicates in which range an object is included.

Advantageous Effects of Invention

According to one aspect of the present disclosure, the efficiency of image processing can be improved. According to another aspect, a high-quality composite image can be generated.

DESCRIPTION OF EMBODIMENTS

An outline of several exemplary embodiments of the present disclosure will be described. The outline is a simplified explanation regarding several concepts of one or multiple embodiments as an introduction to the detailed description described below in order to provide a basic understanding of the embodiments, and is by no means intended to limit the scope of the present invention or disclosure. The outline is by no means a comprehensive outline of all contemplated embodiments, and is by no means intended to specify essential elements of all embodiments or to delimit the scope of any or all aspects. For convenience, in some cases, "one embodiment" as used herein refers to a single embodiment (embodiment or variation) or a plurality of embodiments (embodiments or variations) disclosed in the present specification.

A gating camera according to one embodiment includes an illumination device configured to irradiate a field of view with pulsed illumination light, an image sensor, a camera controller configured to control a light emission timing of the illumination device and an exposure timing of the image sensor, and an image processing device configured to generate a composite image by synthesizing a plurality of slice images output from the image sensor. The image processing device is configured to set, as a valid range, a range that takes a local maximum value when pixels at the same position in each of the plurality of slice images are arranged in range order, and to generate a pixel value at the same position in the composite image on the basis of a pixel value at the same position in the slice image corresponding to the valid range.

According to this configuration, a range in which an object exists can be accurately detected, as compared with a case where it is determined that an object is included in a range taking a maximum value. With this processing, an image quality of the composite image can be improved.

The gating camera according to one embodiment is configured to divide a field of view in a depth direction into a plurality of ranges and to generate a plurality of slice images corresponding to the plurality of ranges. The gating camera includes an illumination device configured to irradiate a field of view with pulsed illumination light, an image sensor, a camera controller configured to control a light emission timing of the illumination device and an exposure timing of the image sensor, and an image processing device configured to receive a plurality of slice images from the image sensor and to generate a distance map image. A pixel in the distance map image indicates in which range an object is included.

The distance map image shows which range of objects exist at a position in left, right, up and down directions of the field of view. By generating the distance map image, the efficiency of processing such as synthesizing the plurality of slice images can be improved.

Alternatively, by performing object recognition based on the composite image and referring to the distance map image, it is possible to know in which range the detected object is included.

In one embodiment, the image processing device may be configured to determine that the object is included in a range that takes a local maximum value when pixels at the same position in each of the plurality of slice images are arranged in range order. This makes it possible to accurately detect the range in which the object exists, as compared with a case where it is determined that the object is included in a range taking a maximum value.

In one embodiment, the image processing device may be configured to generate a composite image by synthesizing the plurality of slice images based on the distance map image. In a normal image obtained by a normal camera, a target object is hidden by fog or the like under bad weather such as thick fog. In contrast, a composite image has an advantage in that occlusions such as fog are removed and the target object is captured clearly.

When a plurality of N slice images are processed by an identifier (classifier), N times of processing is required in order to detect objects existing in the full depth of the field of view. In contrast, by inputting one composite image into the identifier, objects existing in the full depth of the field of view can be detected in one processing.

Hereinafter, favorable embodiments will be described with reference to the drawings. The same or equivalent components, members and processing shown in each drawing are denoted with the same reference numerals, and repeated descriptions will be omitted appropriately. Furthermore, the embodiments are illustrative, not limiting the present disclosure and invention, and all features described in the embodiments and combinations thereof are not necessarily essential features of the present disclosure and invention.

Figure 1:
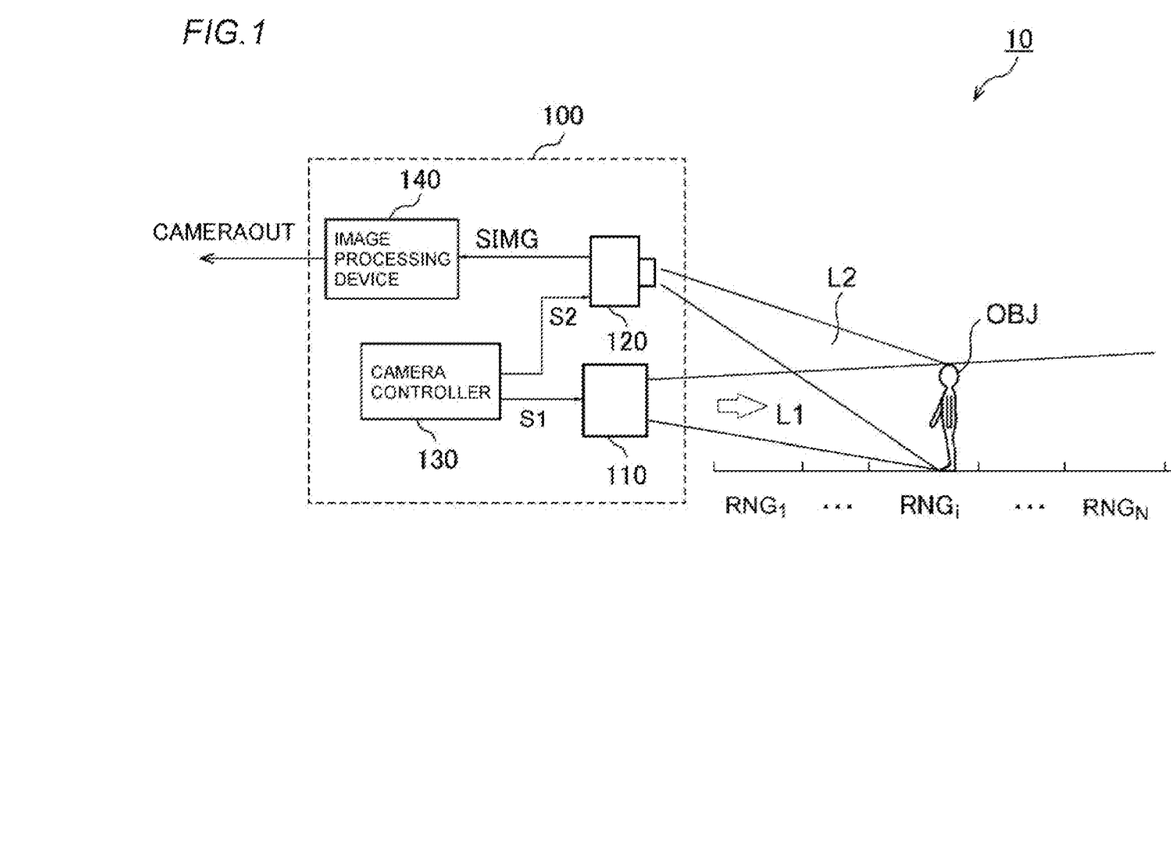
FIG. 1 is a block diagram of a sensing system according to an embodiment.

FIG. 1 is a circuit block diagram of a sensing system 10 according to an embodiment. The sensing system 10 is mounted on a vehicle such as an automobile or a motorcycle, and detects an object OBJ around the vehicle.

The sensing system 10 mainly includes a gating camera 100. The gating camera 100 include an illumination device 110, an image sensor 120, a camera controller 130, and an image processing device 140. The gating camera 100 divides a field of view in a depth direction into N ranges $RNG_1$ to $RNG_N$ (N≥2), and performs imaging. Adjacent ranges may overlap in the depth direction at their boundaries.

The illumination device 110 irradiates the front of the vehicle with pulsed illumination light L1 in synchronization with a light emission timing signal S1 provided from the camera controller 130. The pulsed illumination light L1 is preferably infrared light, but is not limited thereto, and may be visible light or ultraviolet light having a predetermined wavelength. The gating camera 100 according to the present embodiment can perform sensing not only at night but also during the day, and therefore, a wavelength longer than 0.9 µm is selected.

The image sensor 120 includes a plurality of pixels, can control exposure in synchronization with an exposure timing signal S2 provided from the camera controller 130, and generates a slice image SIMG composed of a plurality of pixels. The image sensor 120 has sensitivity to the same wavelength as the pulsed illumination light L1 and captures reflected light (return light) L2 reflected by the object OBJ.

The camera controller 130 controls an illumination timing (light emission timing) of the pulsed illumination light L1 by the illumination device 110 and an exposure timing by the image sensor 120, and causes the image sensor 120 to generate a plurality of slice images $SIMG_1$ to $SIMG_N$ corresponding to the plurality of ranges $RNG_1$ to $RNG_N$. The functions of the camera controller 130 may be implemented by software processing, hardware processing, or a combination of software processing and hardware processing. The software processing is specifically implemented by a combination of a processor (hardware) such as a central processing unit (CPU), a micro processing unit (MPU) and a microcomputer and a software program executed by the processor (hardware). Note that the camera controller 130 may be a combination of multiple processors and software programs. The hardware processing is specifically implemented by hardware such as an application specific integrated circuit (ASIC), a controller IC, and a field programmable gate array (FPGA).

The images (slice images) $SIMG_1$ to $SIMG_N$ generated by the image sensor 120 are input to the image processing device 140. The image processing device 140 performs processing on the plurality of slice images $SIMG_1$ to $SIMG_N$ obtained for the plurality of ranges $RNG_1$ to $RNG_N$ and generates final output data CAMERAOUT. For example, the output data CAMERAOUT may include a set of the plurality of slice images $SIMG_1$ to $SIMG_N$ and the composite image CIMG obtained by synthesizing the slice images. The output data CAMERAOUT may further include a distance map image DIMG, which will be described below.

The image processing device 140 may be mounted on the same hardware as the camera controller 130, or may be configured as separate hardware. Alternatively, some or all of the functions of the image processing device 140 may be implemented as a processor or digital circuit built in the same module as the image sensor 120.

The above is the basic configuration of the gating camera 100. Subsequently, operations thereof will be described.

Figure 2:
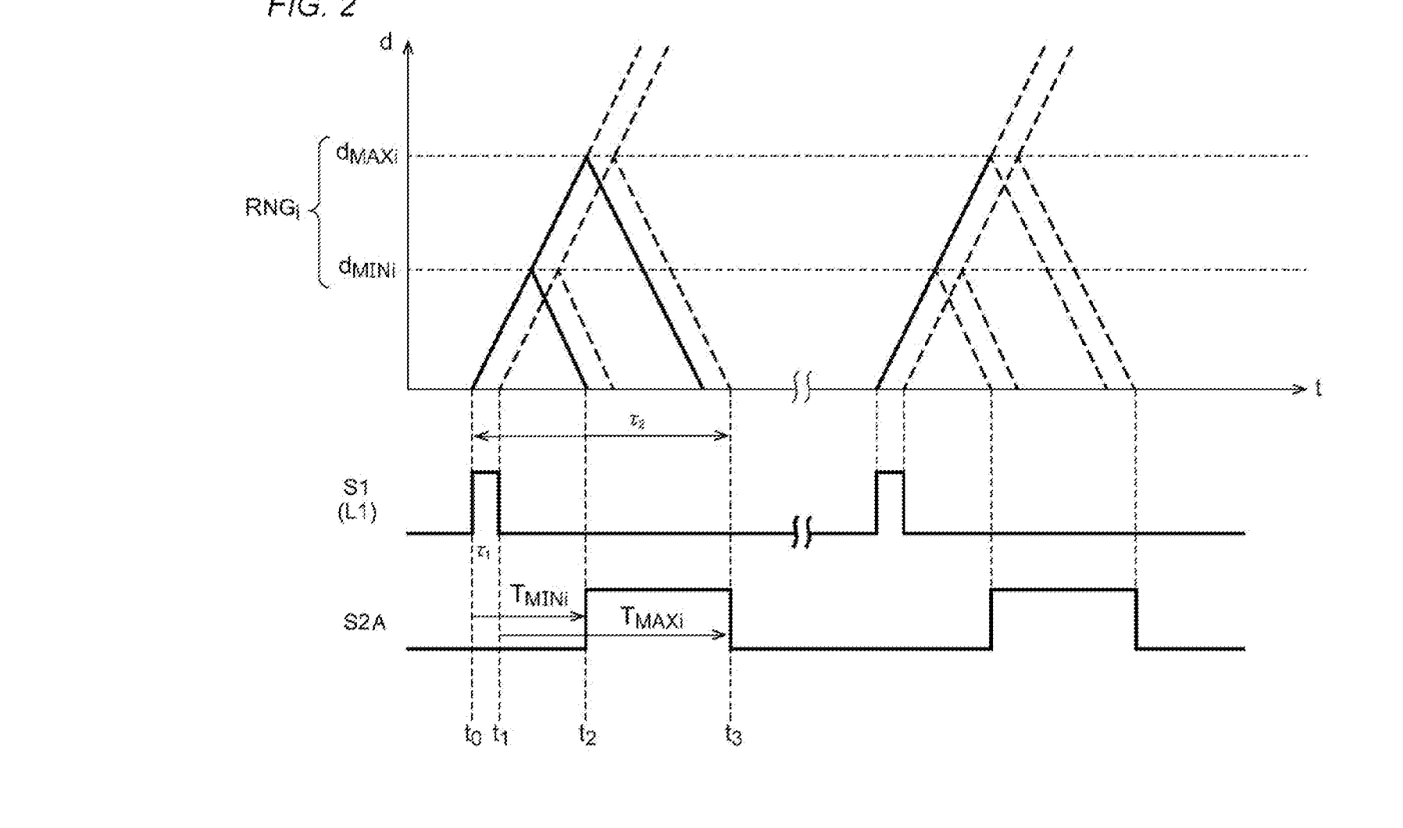
FIG. 2 is a view illustrating a basic operation of a gating camera.

FIG. 2 is a diagram illustrating a basic operation of the gating camera 100. FIG. 2 shows an aspect when sensing an i-th range $RNG_i$. The illumination device 110 emits light during a light emission period $\tau_1$ between time t0 and time $t_1$ in synchronization with the light emission timing signal S1. At the top, a diagram of a light beam where a time is indicated on the horizontal axis and a distance is indicated on the vertical axis is shown. A distance from the gating camera 100 to a front side boundary of the range $RNG_i$ is set to $d_{MINi}$ and a distance from the gating camera 100 to a deep side boundary of the range $RNG_i$ is set to $d_{MAXi}$.

Round-trip time $T_{MINi}$ from when light emitted from the illumination device 110 at a certain time point reaches the distance $d_{MINi}$ to when reflected light returns to the image sensor 120 is expressed as $$T_{MINi} = 2 \times d_{MINi}/c,$$

in which c is the speed of light.

Similarly, round-trip time $T_{MAXi}$ from when light emitted from the illumination device 110 at a certain time point reaches the distance $d_{MAXi}$ to when reflected light returns to the image sensor 120 is expressed as $$T_{MAXi} = 2 \times d_{MAXi}/c.$$

When it is desired to image the object OBJ included in the range $RNG_i$, the camera controller 130 generates the exposure timing signal S2 so that the exposure starts at a time point $t_2=t_0+T_{MINi}$ and ends at a time point $t_3=t_1+T_{MAXi}$. This is one sensing operation.

The sensing of the i-th range $RNG_i$ may include a plurality of sets of light emission and exposure. The camera controller 130 repeats the aforementioned sensing operation multiple times at a predetermined period 12.

For example, the image sensor 120 can perform multiple exposure, and can subjecting multiple reflected lights, which are obtained as a result of performing pulsed light emission multiple times, to multiple exposure in an FD region (charge accumulation region) for each pixel px, thereby generating one slice image SIMG.

Figure 3A:
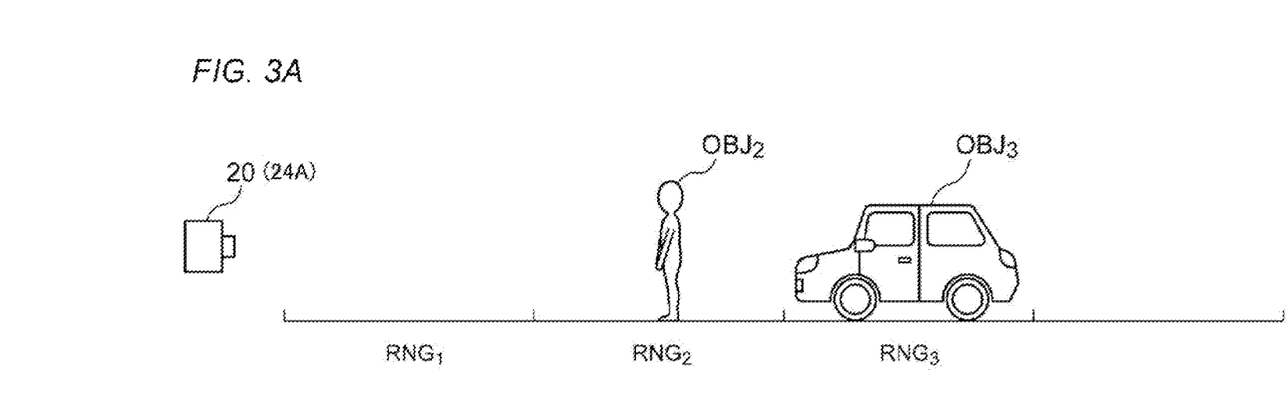
FIG. 3A and FIG. 3B are views illustrating slice images obtained by the gating camera.
Figure 3B:
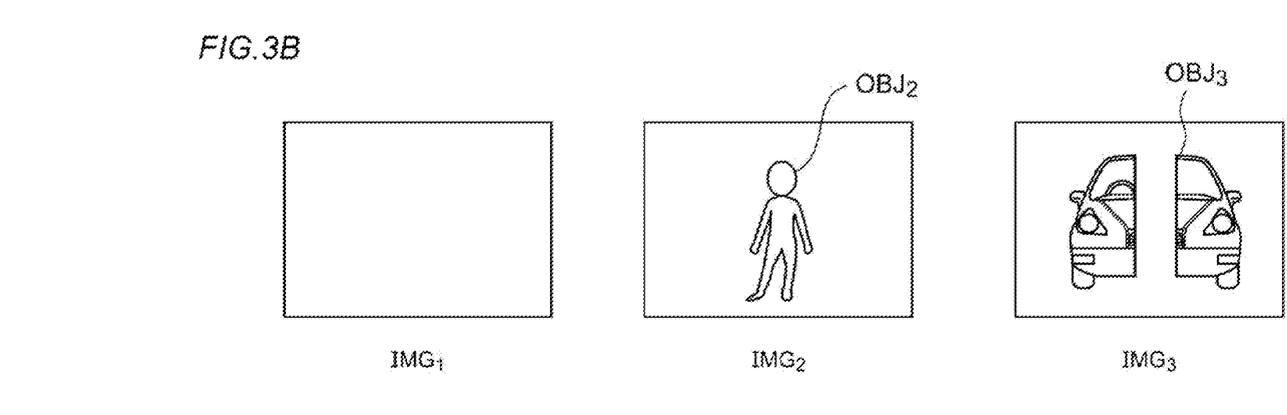

FIG. 3A and FIG. 3B are views illustrating slice images obtained by the gating camera 100. In the example of FIG. 3A, an object (pedestrian) $OBJ_2$ is present in the range $RNG_2$ and an object (vehicle) $OBJ_3$ is present in the range $RNG_3$. FIG. 3B shows a plurality of slice images $SIMG_1$ to $SIMG_3$ obtained in a situation in FIG. 3A. When the slice image $SIMG_1$ is captured, no object image appears in the slice image $SIMG_1$ because the image sensor is exposed only to reflected light from the range $RNG_1$.

When the slice image $SIMG_2$ is captured, only the object image $OBJ_2$ appears in the slice image $SIMG_2$ because the image sensor is exposed only to reflected light from the range $RNG_2$. Similarly, when the slice image $SIMG_3$ is captured, only the object image $OBJ_3$ appears in the slice image $SIMG_3$ because the image sensor is exposed only to reflected light from the range $RNG_3$. In this way, an object can be separately imaged on a range basis by the gating camera 100.

Returning to FIG. 1, the image processing device 140 generates a composite image CIMG by synthesizing the plurality of slice images $SIMG_1$ to $SIMG_N$ after the sensing of the full ranges $RNG_1$ to $RNG_N$ is completed. The composite image CIMG is similar to a normal image captured with a normal camera in that the objects in the full ranges $RNG_1$ to $RNG_N$ are included.

The generation processing of the composite image CIMG by the image processing device 140 will be described.

Figure 4:
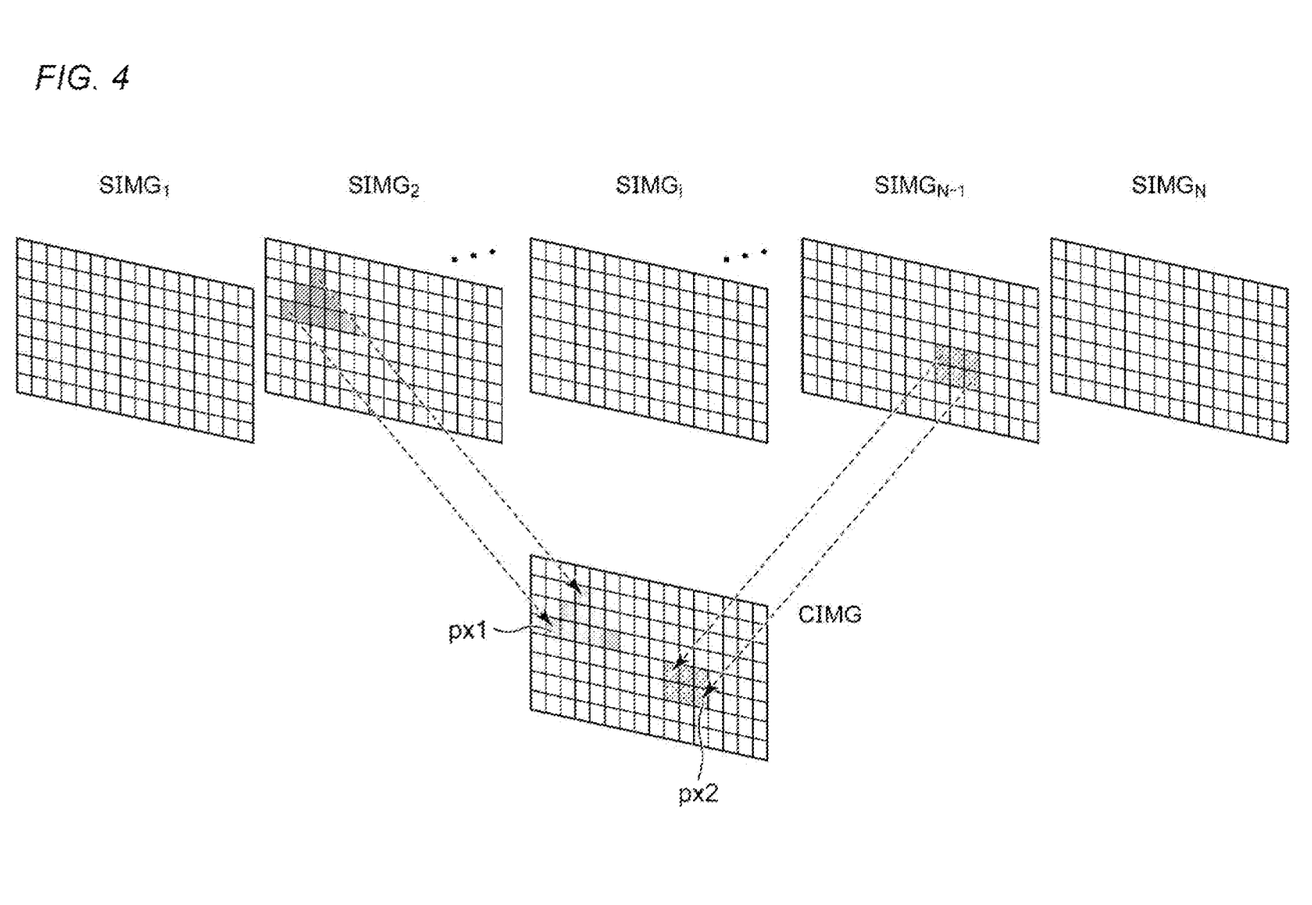
FIG. 4 is a view illustrating generation of a composite image CIMG based on a plurality of slice images $SIMG_1$ to $SIMG_N$.

FIG. 4 is a view illustrating generation of the composite image CIMG based on the plurality of slice images $SIMG_1$ to $SIMG_N$.

As described above, in an ideal gating camera, the object $OBJ_i$ present in the i-th range $RNG_i$ is captured only in the slice image $SIMG_i$ corresponding to the range.

With attention focused on certain pixels (referred to as pixels of interest) in the plurality of slice images $SIMG_1$ to $SIMG_N$, only a pixel of interest in one slice image has a pixel value corresponding to reflected light from an object, and the pixels of interest in the remaining slice images have pixel values unrelated to the object. A slice image in which the pixel of interest has a pixel value corresponding to reflected light from an object is called a valid image, and a range corresponding to the valid image is called a valid range. Furthermore, a slice image in which the pixel of interest does not have a pixel value corresponding to the reflected light from the object is called an invalid image, and a range corresponding to the invalid image is called an invalid range. The valid image (valid range) can be selected for each position of the pixel of interest.

In the example of FIG. 4, when a pixel px1 is set as a pixel of interest, the slice image $SIMG_2$ is a valid image, and the other images become invalid images. When a pixel px2 is set as a pixel of interest, the slice image $SIMG_{N-1}$ is a valid image, and the other images become invalid images.

A pixel value c1 of each pixel in the composite image CIMG corresponds to a pixel value c2 of the pixel of interest in the valid image when the pixel is set as the pixel of interest. For example, the pixel value c1 may be the same as the pixel value c2, or may be a value obtained by performing predetermined calculation processing on the pixel value c2.

Figure 5:
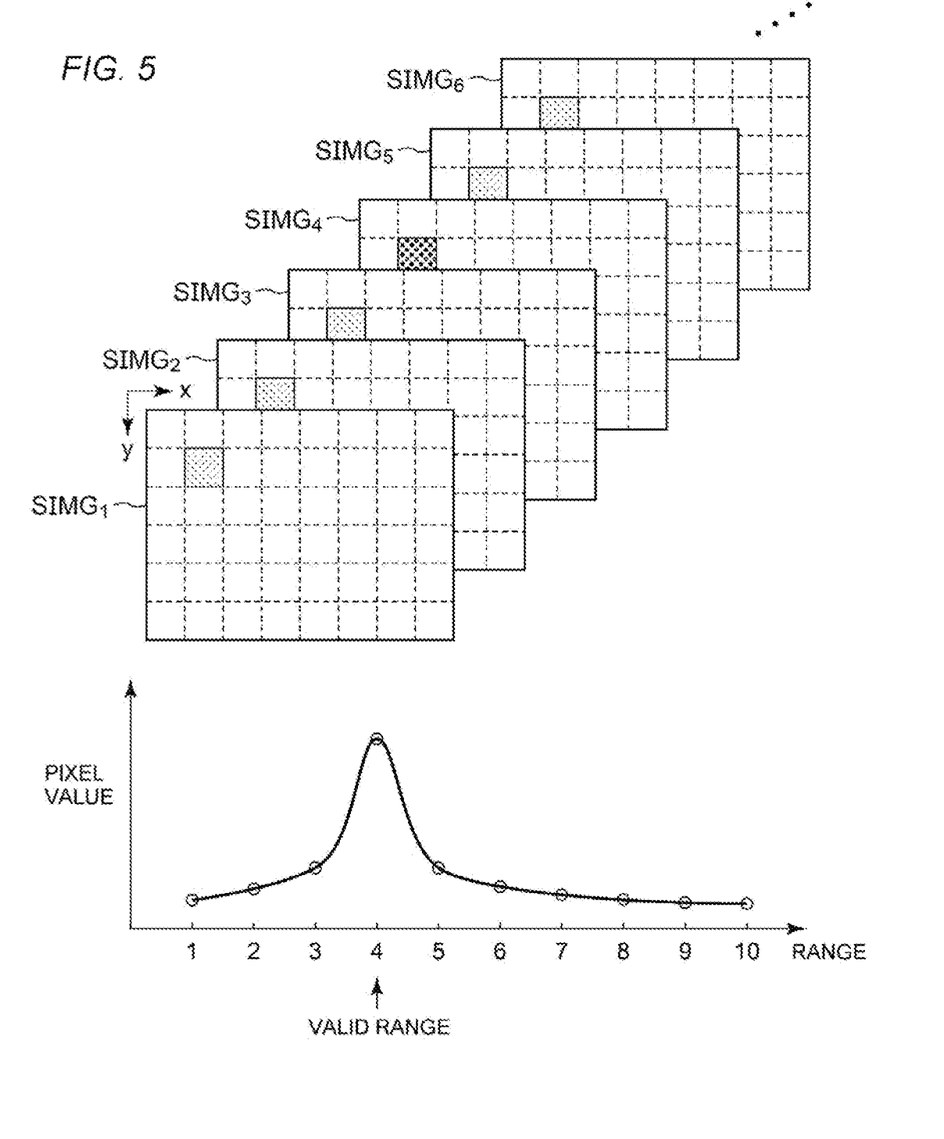
FIG. 5 is a view illustrating determination of a valid image and a valid range of a pixel of interest.

FIG. 5 is a view illustrating determination of a valid image and a valid range of a pixel of interest. A pixel at a position of x=2 and y=2 is a pixel of interest.

The image processing device 140 generates an array (pixel array) in which pixel values of pixels of interest at the same position in each of the plurality of slice images SIMG$_1$ to SIMG$_N$ are arranged in range order. This array is shown at the bottom of FIG. 5. Then, a range that takes a local maximum value is detected and set as a valid range. When a j-th (j=4 in the example in FIG. 5) range RNG$_j$ takes the local maximum value, the range RNG$_j$ is a valid range, and the corresponding slice image SIMG$_j$ becomes a valid image.

The image processing unit 140 generates a pixel value at the same position in the composite image CIMG, based on the pixel value at the same position as the pixel of interest in the slice image SIMG$_j$ corresponding to the valid range RNG$_j$.

In a normal image obtained by a normal camera, a target object is hidden by fog or the like under bad weather such as thick fog. In contrast, the composite image CIMG has an advantage in that occlusions such as fog are removed and the target object is captured clearly.

Figure 6A:
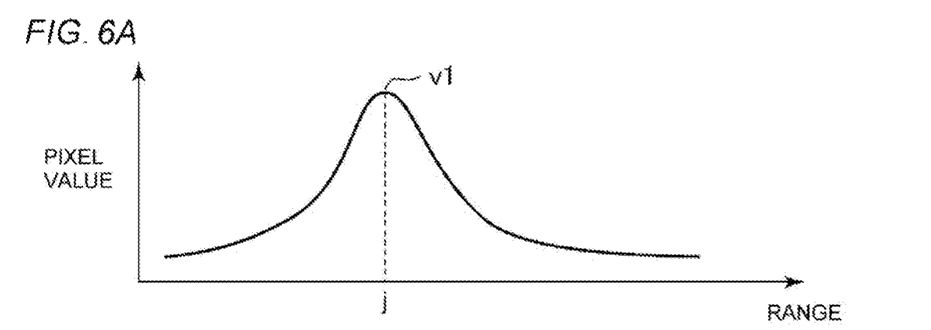
FIG. 6A to FIG. 6D are views each showing a relationship between a pixel array and a valid range.

FIG. 6A to FIG. 6D are views each showing a relationship between a pixel array and a valid range. In the example of FIG. 6A, the array includes only a single local maximum value v1, and this local maximum value v1 is also the maximum value in this array. When the local maximum value v1 is a j-th element of the array, the j-th range RNG$_j$ becomes a valid range.

Figure 6B:
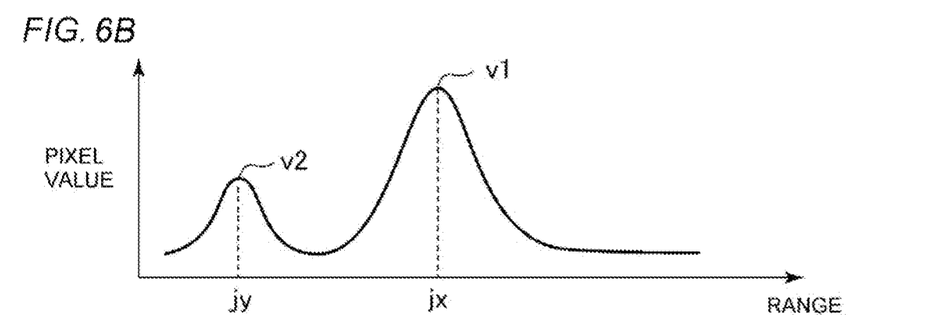

In the example of FIG. 6B, the array includes a plurality of local maximum values v1 and v2. In this case, the valid range may be determined based on the greatest local maximum value v1, and therefore, a jx-th range RNG$_{jx}$ becomes a valid range.

Alternatively, in sensing in automobiles, it can be said that an object closer to a host vehicle has higher importance or interest than a distant object. Therefore, when there are a plurality of local maximum values v1 and v2 as shown in FIG. 6B, the valid range may be determined based on the local maximum value v2 closest to the host vehicle. In the example of FIG. 6B, a jy-th range RNG$_{jy}$ can be set as a valid range.

Figure 6C:
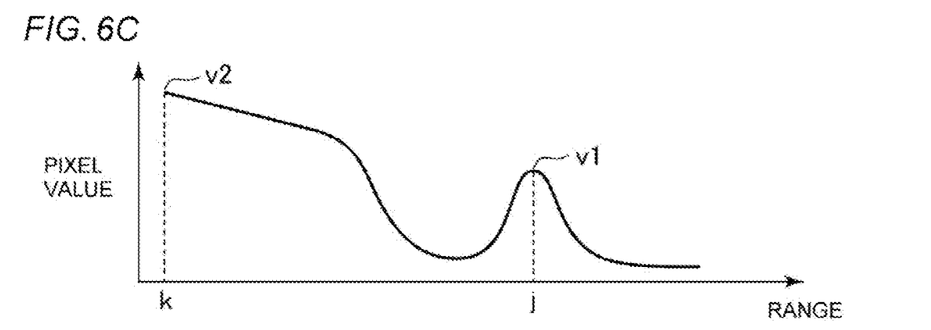

In the example of FIG. 6C, the array includes a local maximum value v1. The local maximum value v1 is different from the maximum value v2 in this array. In this case, the valid range is determined based on the greatest local maximum value v1, not the maximum value v2 of the array.

Figure 6D:
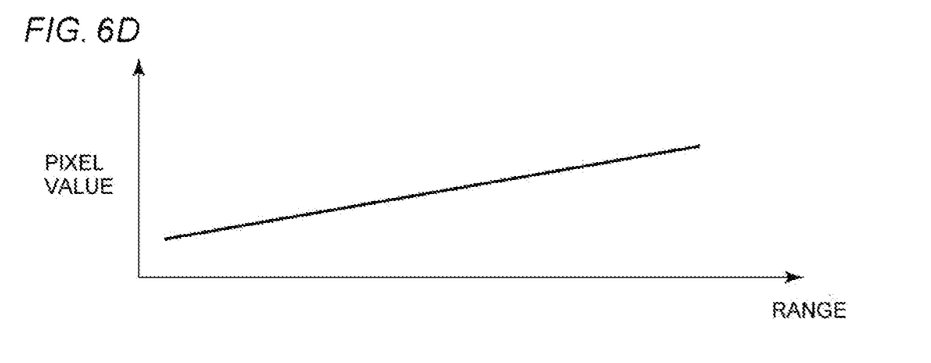

In FIG. 6D, there is no local maximum value in the array. In this case, it is determined that there is no valid range.

Detection of the valid range based on the local maximum value has the following advantages compared to Comparative Techniques. In Comparative Technique 1, it is assumed that the valid range is determined based on the maximum value, not the local maximum value. In the Comparative Technique, in the situation shown in FIG. 6C, a k-th range, not the j-th range, becomes the valid range.

Figure 7:
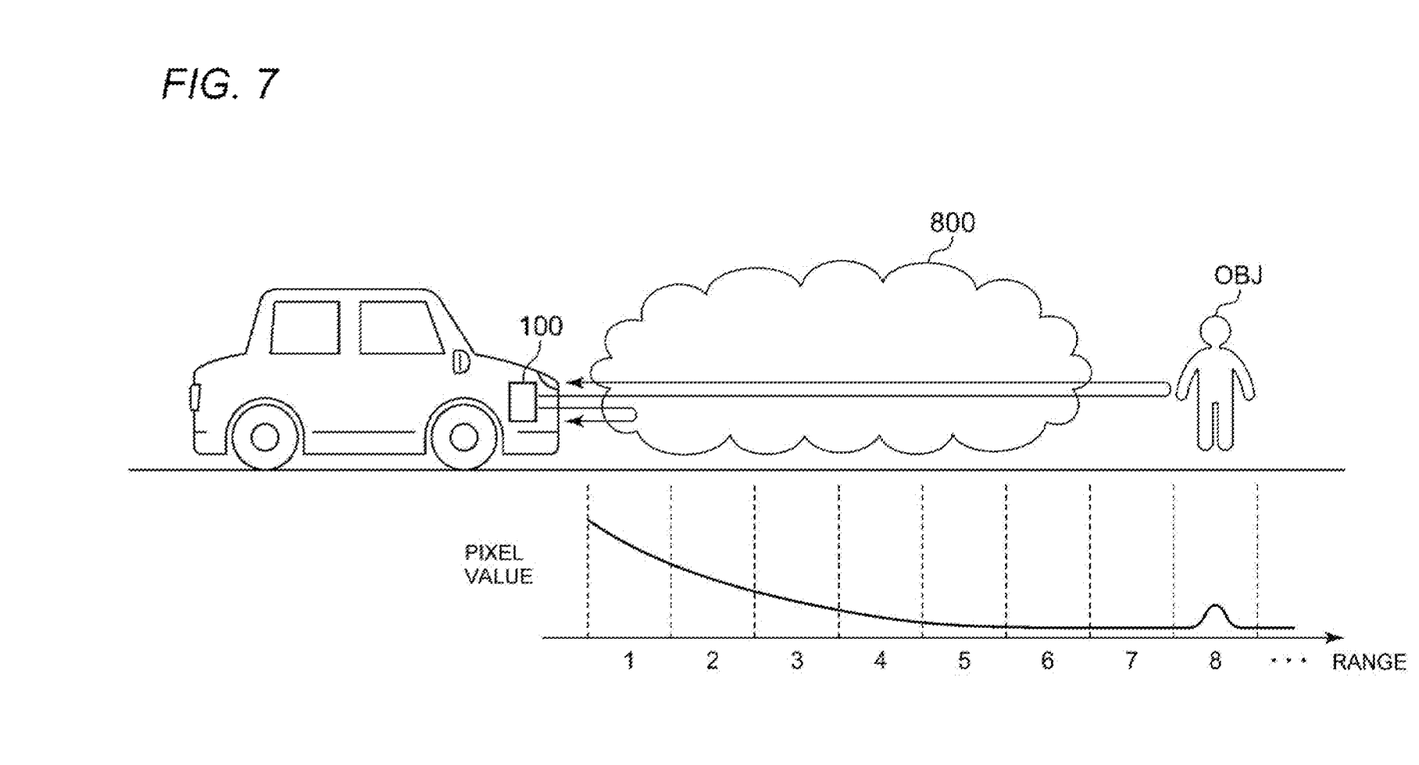
FIG. 7 is a view showing a traveling scene in a foggy environment.

FIG. 7 is a view showing a traveling scene in a foggy environment. At the bottom of FIG. 7, a plot of the array of pixels of interest is shown. The pulsed illumination light L1 emitted from the gating camera 100 passes through the fog 800 and reaches the object OBJ. A portion of the pulsed illumination light L1 is reflected by the fog 800, and a portion of the weak pulsed illumination light L1 reaches the object OBJ present in a deep-side range. Therefore, in the array of pixels of interest where the object OBJ should be captured, the pixel value in a front side range becomes the maximum, and the pixel value in the range RNG$_8$ where the object OBJ is present becomes smaller. Therefore, if the Comparative Technique is adopted, the first range RNG$_1$ is erroneously determined as being a valid range.

In contrast, according to the determination of the valid range using the local maximum value, the deep-side range RNG$_8$ where the object OBJ is present can be accurately determined as being a valid range.

Figure 8:
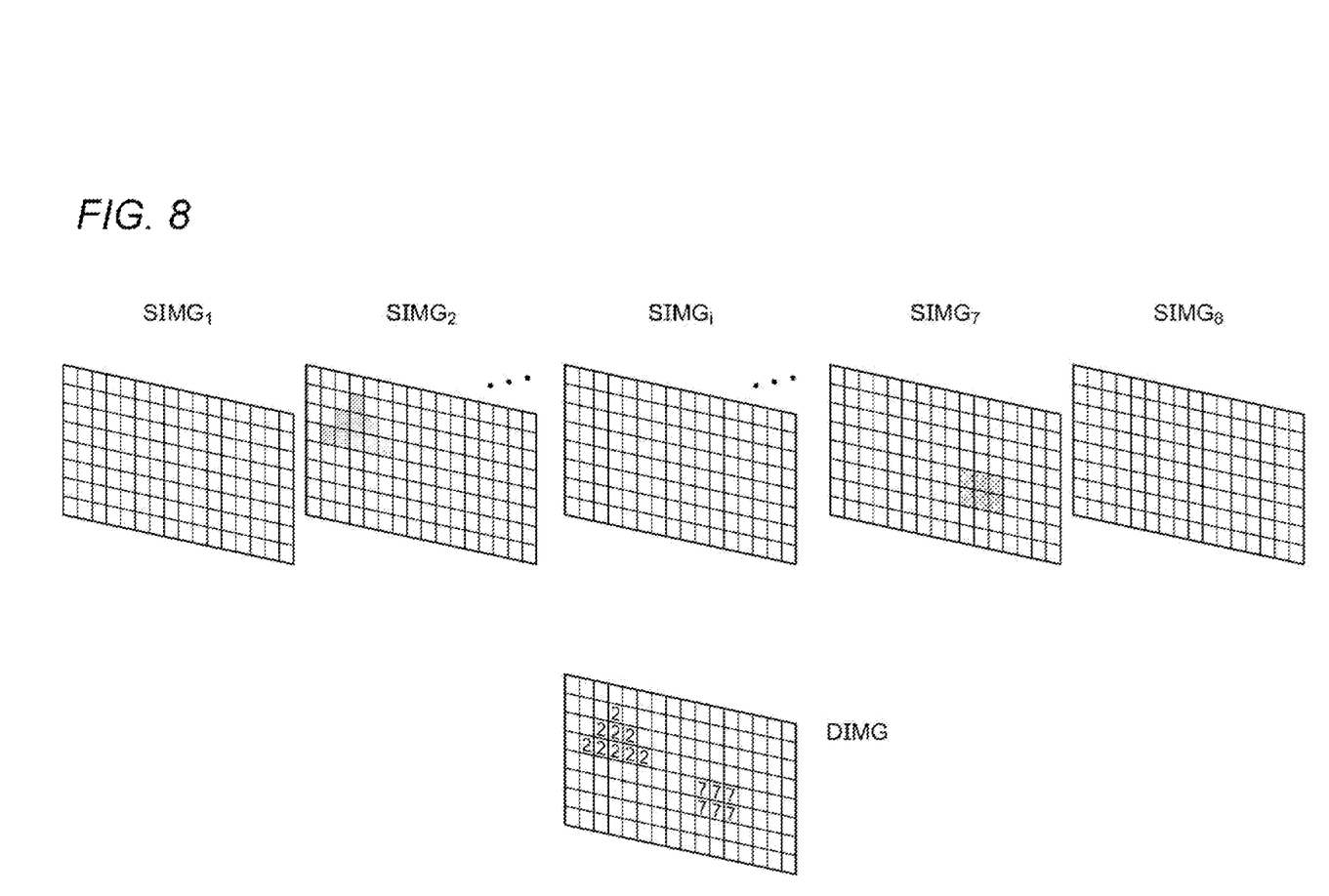
FIG. 8 is a view illustrating a distance map image DIMG.

The image processing device 140 can generate a distance map image DIMG in the process of generating the composite image CIMG. Each pixel in the distance map image DIMG indicates in which range an object is included, in other words, which range is a valid range, when the pixel is selected as the pixel of interest. FIG. 8 is a view illustrating the distance map image DIMG. Here, it is assumed that N=8.

After generating the distance map image DIMG, the image processing device 140 can generate the composite image CIMG based on the distance map image DIMG.

Figure 9:
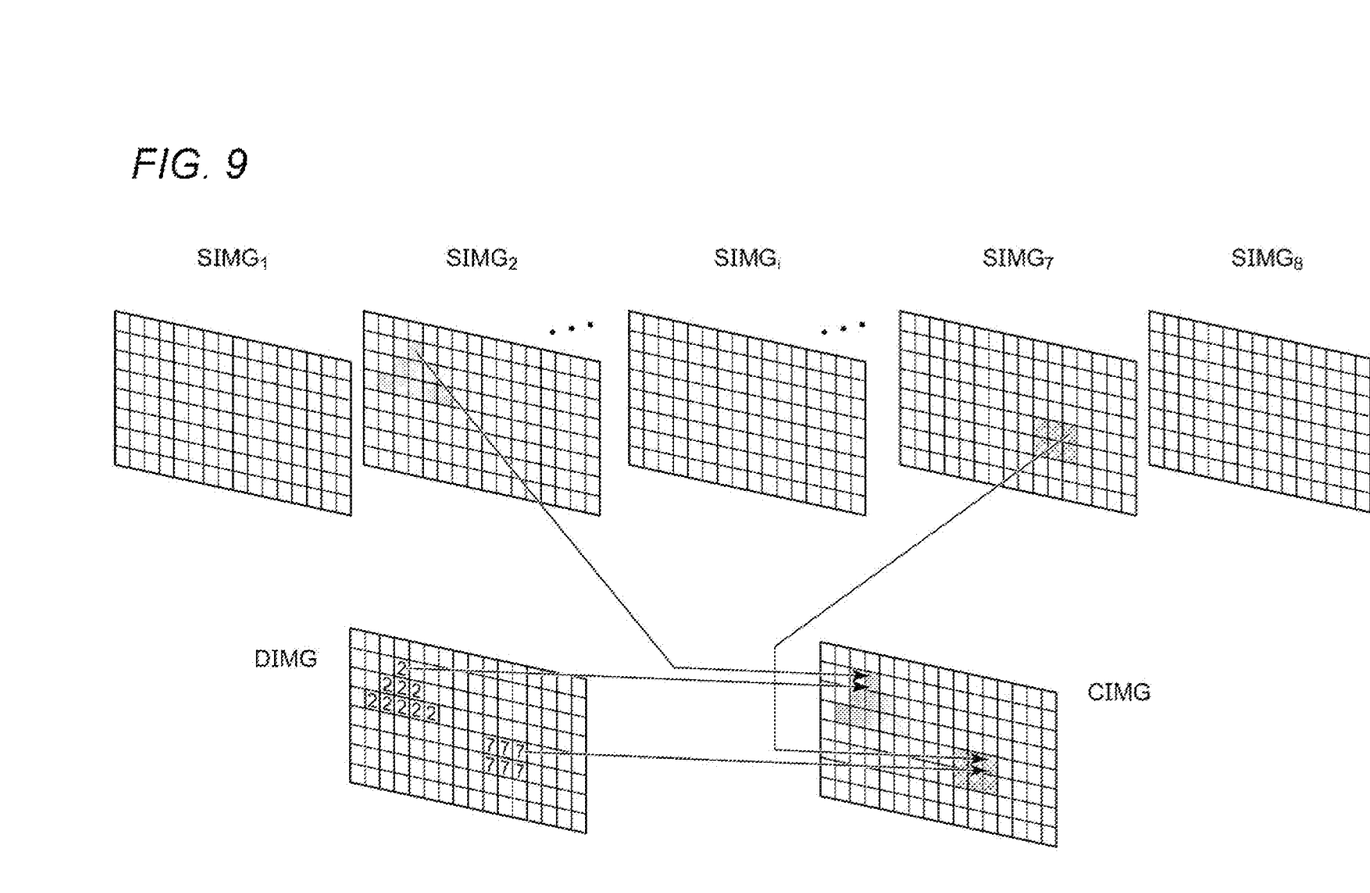
FIG. 9 is a view illustrating generation of a composite image CIMG using the distance map image DIMG.

FIG. 9 is a view illustrating generation of the composite image CIMG using the distance map image DIMG. The pixel value in the distance map image DIMG is a pointer indicating which slice image SIMG is a valid image. The pixel value of the coordinates (x, y) of the distance map image DIMG is expressed as DIMG(x, y). Similarly, the pixel value of the coordinates (x, y) of the slice image SIMG; is expressed as DIMG(x, y), and the pixel value of the coordinates (x, y) of the composite image CIMG is expressed as CIMG(x, y). At this time, the composite image CIMG can be expressed based on the following equation.

$$j = DIMG(x, y)$$
$$CIMG(x, y) = SIMG_j(x, y)$$

Alternatively, a predetermined function f( ) may be defined, and an equation of CIMG(x, y)=f(SIMG$_j$(x, y)) may be used.

(Use)

Figure 10:
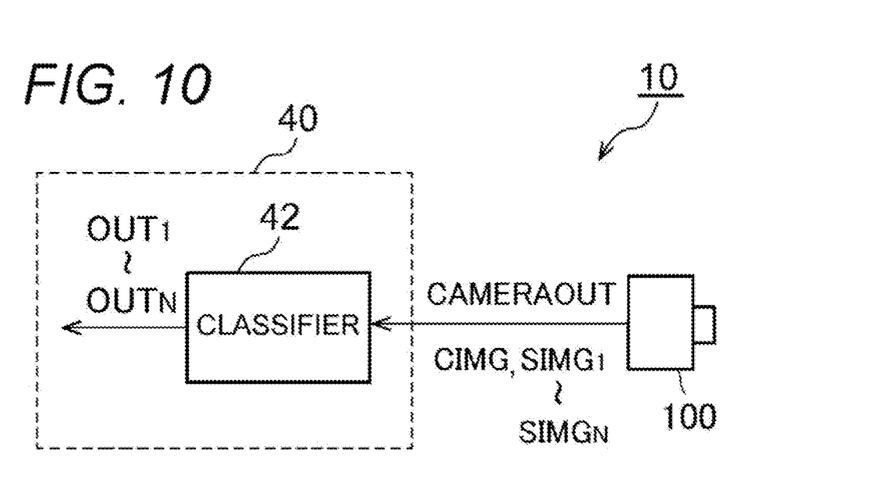
FIG. 10 is a block diagram of a sensing system.

FIG. 10 is a block diagram of the sensing system 10. The sensing system 10 includes an arithmetic processing device 40, in addition to the gating camera 100 described above. The sensing system 10 is an object detection system that is mounted on a vehicle such as an automobile and a motorcycle and determines a type (also called category or class) of an object OBJ around the vehicle.

The gating camera 100 generates a plurality of slice images SIMG$_1$ to SIMG$_N$ corresponding to a plurality of ranges RNG$_1$ to RNG$_N$. The output data CAMERAOUT of the gating camera 100 includes the plurality of slice images SIMG$_1$ to SIMG$_N$ and the composite image CIMG.

The arithmetic processing device 40 is configured to be able to identify a type of an object on the basis of the output data CAMERAOUT of the gating camera 100. The arithmetic processing device 40 includes a classifier 42 installed on the basis of a learned model generated by machine learning. The arithmetic processing device 40 may include a plurality of classifiers 42 optimized for each range. An algorithm of the classifier 42 is not particularly limited, but YOLO (You Only Look Once), SSD (Single Shot MultiBox Detector), R-CNN (Region-based Convolutional Neural Network), SPPnet (Spatial Pyramid Pooling), Faster R-CNN, DSSD (Deconvolution-SSD), Mask R-CNN and the like may be adopted, or algorithms to be developed in the future may be adopted.

The functions of the arithmetic processing device 40 may be implemented by software processing, hardware processing, or a combination of software processing and hardware processing. The software processing is specifically implemented by a combination of a processor (hardware) such as a central processing unit (CPU), a micro processing unit (MPU) and a microcomputer and a software program executed by the processor (hardware). Note that the arithmetic processing device 40 may be a combination of multiple processors and software programs. The hardware processing is specifically implemented by hardware such as an application specific integrated circuit (ASIC), a controller IC, and a field programmable gate array (FPGA). The functions of the arithmetic processing device 40 and the functions of the image processing device 140 may be implemented in the same processor.

Each of the plurality of slice images $SIMG_1$ to $SIMG_N$ is input to the classifier 42, so that objects can be identified for each range. Furthermore, the composite image CIMG is input to the classifier 42, so that objects present in the full range can be simultaneously identified.

Figure 11A:
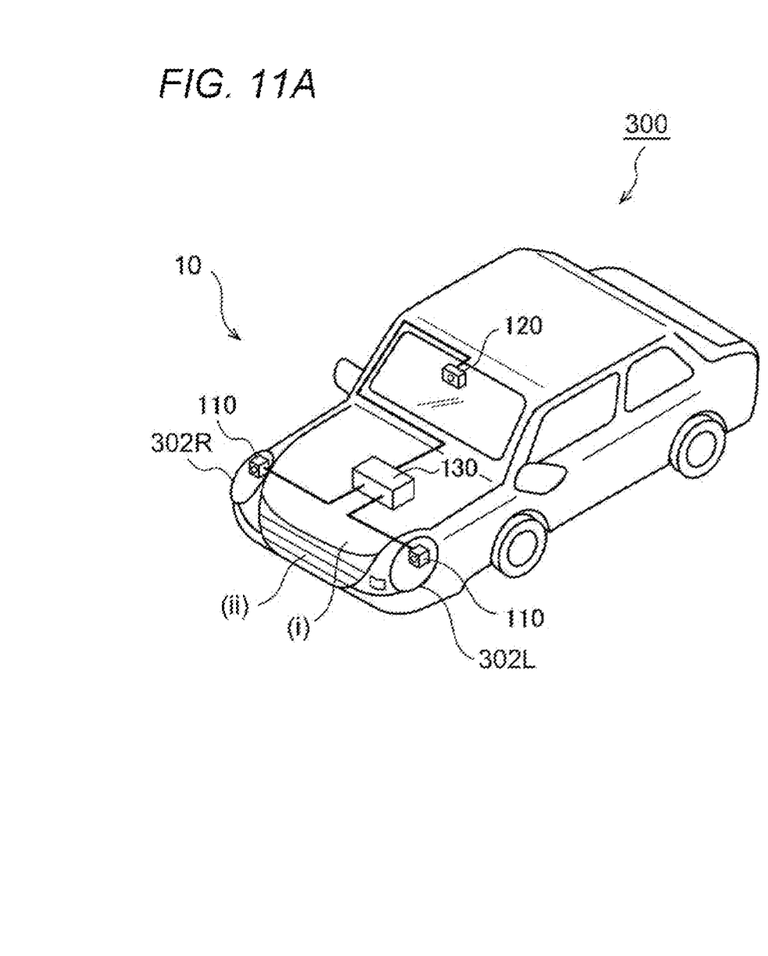
FIGS. 11A and 11B are views each showing an automobile having a gating camera.
Figure 11B:
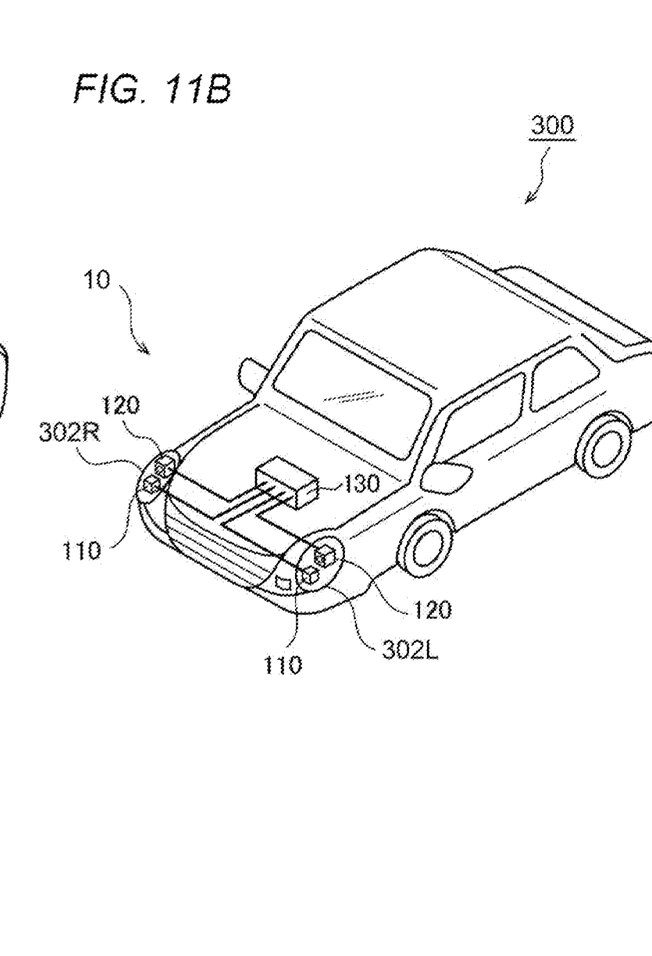

FIG. 11A and FIG. 11B are views each illustrating an automobile 300 having the gating camera 100. Referring to FIG. 11A, the automobile 300 includes headlamps (lamps) 302L and 302R.

As shown in FIG. 11A, the illumination device 110 of the gating camera 100 may be built in at least one of the left and right headlamps 302L and 302R. The image sensor 120 can be attached to a part of the vehicle, for example, a rear side of the room mirror. Alternatively, the image sensor 120 may be provided on the front grill or front bumper. The camera controller 130 may be provided in a vehicle compartment or an engine room, or may be built in the headlamp 302L or 302R.

As shown in FIG. 11B, the image sensor 120 may be built in any one of the left and right headlamps 302L and 302R together with the illumination device 110.

The illumination device 110 may be provided at a part of the vehicle, for example, on a rear side of the room mirror, the front grill, or the front bumper.

Figure 12:
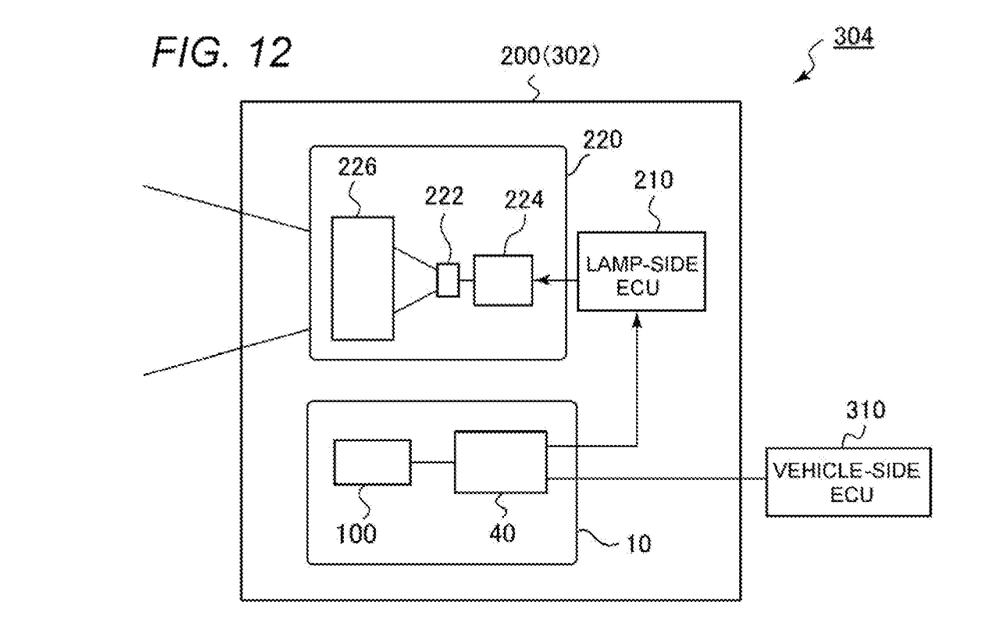
FIG. 12 is a block diagram showing a vehicle lamp including a sensing system.

FIG. 12 is a block diagram showing a vehicle lamp 200 including the sensing system 10. The vehicle lamp 200 configures a lamp system 304 together with a vehicle-side ECU 310. The vehicle lamp 200 includes a lamp-side ECU 210 and a lamp unit 220. The lamp unit 220 is a low beam or a high beam, and includes a light source 222, a lighting circuit 224, and an optical system 226. Further, the vehicle lamp 200 includes the sensing system 10.

Information about the object OBJ detected by the sensing system 10 may be used for light distribution control of the vehicle lamp 200. Specifically, the lamp-side ECU 210 generates a proper light distribution pattern on the basis of information about a type and a position of the object OBJ generated by the sensing system 10. The lighting circuit 224 and the optical system 226 operate so that the light distribution pattern generated by the lamp-side ECU 210 is obtained. The arithmetic processing device 40 of the sensing system 10 may be provided outside the vehicle lamp 200, that is, on a vehicle side.

Furthermore, the information about the object OBJ detected by the sensing system 10 may be transmitted to the vehicle-side ECU 310. The vehicle-side ECU 310 may use this information for automatic driving or driving support.

(Variation 1)

The output data CAMERAOUT of the gating camera 100 may include only the plurality of slice images $SIMG_1$ to $SIMG_N$ and the distance map image DIMG. That is, the image processing device 140 may generate only the distance map image DIMG without generating the composite image CIMG.

In this case, in a processing device external to the gating camera 100, the composite image CIMG can be easily generated based on the plurality of slice images $SIMG_1$ to $SIMG_N$ and the distance map image DIMG.

(Variation 2)

Only the composite image CIMG may be input to the classifier 42 in FIG. 10. The position (range) of the object detected by the classifier 42 from the composite image CIMG can be obtained based on the distance image map DIMG. According to this processing, a computational load of the classifier 42 can be significantly reduced.

(Variation 3)

Ideally, an object included in a certain range is captured only in a slice image corresponding to the range. However, actually, the object may also appear in a slice image of a range adjacent to that range. In this case, the composite image CIMG may be generated based on the following equation.

$$CIMG(x, y) = g(SIMG_j(x, y), SIMG_j(x, y))$$

in which g (u, V) is a function that takes u and V as arguments.

(Variation 4)

The composite image CIMG may be generated directly from the greatest local maximum value without generating the distance map image DIMG.

(Variation 5)

The method for determining the valid image or valid range is not limited to using the local maximum value, and a range that takes the maximum value in the array may be set as the valid range.

The embodiments are merely illustrative, and it should be understood by one skilled in the art that various variations can be made to combinations of components and processing processes in the embodiments and such variations also fall within the scope of the present invention.

The invention claimed is:

1. A gating camera configured to divide a field of view in a depth direction into a plurality of ranges and to generate a plurality of slice images corresponding to the plurality of ranges, the gating camera comprising:
   an illumination device configured to irradiate the field of view with pulsed illumination light;
   an image sensor;
   a camera controller configured to control a light emission timing of the illumination device and an exposure timing of the image sensor; and
   an image processing device configured to generate a composite image by synthesizing the plurality of slice images output from the image sensor,
   wherein the image processing device is configured to set, as a valid range, a range that takes a local maximum pixel value when pixels at the same position in each of the plurality of slice images are arranged in range order, and to generate a pixel value at the same position in the composite image on the basis of a pixel value at the same position in the slice image corresponding to the valid range.

2. The gating camera according to claim 1, wherein the image processing device is configured to generate a distance map image in which each pixel indicates the valid range.

3. A sensing system for a vehicle, comprising:
the gating camera according to claim 1; and
a classifier configured to process the plurality of slice images generated by the gating camera and the composite image.

4. A vehicle lamp comprising the gating camera according to claim 1.

5. A gating camera configured to divide a field of view in a depth direction into a plurality of ranges and to generate a plurality of slice images corresponding to the plurality of ranges, the gating camera comprising:
an illumination device configured to irradiate the field of view with pulsed illumination light;
an image sensor;
a camera controller configured to control a light emission timing of the illumination device and an exposure timing of the image sensor; and
an image processing device configured to receive a plurality of slice images from the image sensor and to generate a distance map image,
wherein a pixel in the distance map image indicates in which range an object is included, and
wherein the image processing device is configured to determine that the object is included in a range that takes a local maximum pixel value when pixels at the same position in each of the plurality of slice images are arranged in range order.

6. The gating camera according to claim 5, wherein the image processing device is configured to synthesize the plurality of slice images based on the distance map image and to generate a composite image.

7. A sensing system for a vehicle, comprising:
the gating camera according to claim 5; and
a classifier configured to process the plurality of slice images generated by the gating camera and the composite image.

8. A vehicle lamp comprising the gating camera according to claim 5.

* * * * *